United States Patent Office 3,505,266
Patented Apr. 7, 1970

3,505,266
PROCESS FOR THE PRODUCTION OF SPINNABLE ACRYLONITRILE POLYMER SOLUTIONS
Carlhans Suling, Dieter Kramer, and Manfred Unbehend, Leverkusen, Germany, assignors to Farbenfabriken Bayer Aktiengesellschaft, Leverkusen, Germany, a corporation of Germany
No Drawing. Filed May 8, 1967, Ser. No. 636,637
Claims priority, application Germany, May 14, 1966,
F 49,212
Int. Cl. C08f 1/76, 3/76
U.S. Cl. 260—30.8                      6 Claims

ABSTRACT OF THE DISCLOSURE

Spinnable acrylonitrile polymer solutions are produced by polymerizing acrylonitrile in an organic solvent at low temperatures in the presence of a catalytic alkali metal salt having the formula

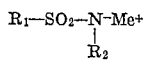

wherein Me represents lithium, sodium, potassium, rubidium or ceasium, $R_1$ represents an alkyl radical, and $R_2$ represents an alkyl radical.

---

This invention relates to a process for the production of acrylonitrile polymers by the solution polymerisation of acrylonitrile, resulting in the formation of spinnable solutions of these polymers.

It is known that polyacrylonitrile can be polymerised in solution in a variety of solvents. As far as the conventional polymerisation initiators for solution polymerisation are concerned, it is necessary to distinguish between two large groups:

(1) Radical initiators or initiator systems (cf. Belgian Patent No. 572,655). Initiator systems of this type have the disadvantage that polymerisation has to be carried out at relatively high temperatures and that, due to the high transfer constants of the solvents, the required degree of polymerisation can only be obtained under technically unfavourable conditions, for example, a high monomer concentration coupled with long reaction times.

(2) Initiators or initiation systems which initiate polymerisation by an ionic mechanism (cf. U. S. Patent No. 3,006,895). Initiators such as these are active even at low temperatures. One disadvantage of these conventional catalysts or catalyst systems which initiate polymerisation by an ionic mechanism however is that they do not adequately satisfy all the criteria mentioned below which are for optimal completion of the polymerisation reaction set out below. In the first place, the catalyst should if possible be unaffected by atmospheric oxygen, water and carbon dioxide. Secondly the catalyst should be readily soluble in dimethyl formamide and thirdly it should not decompose the dimethyl formamide at temperatures of up to +10° C.

A process for the production of spinnable acrylonitrile polymer solutions has now been found in which acrylonitrile is polymerised at a temperature from +10 to −68° C. in an organic solvent for polyacrylonitrile or in a mixture of such solvents, in the presence of a small quantity of an alkali-metal salt of an aliphatic sulfonamide corresponding to the general formula

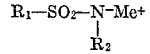

in which Me represents lithium, sodium, potassium, rubidium or caesium, $R_1$ represents an alkyl radical and $R_2$ represents an alkyl radical.

Colourless acrylonitrile polymer solutions are obtained in high yields and, after spinning, give fibres with an excellent natural colour. The films or foils obtained from the polymers also show an outstanding resistance to heat.

Dimethyl formamide or dimethyl sulfoxide are preferably used as the organic solvents. The alkali metal salts of the sulfonamides are solid, crystalline and colourless compounds which are obtained by reacting sulfonamides corresponding to the general formula

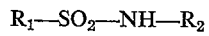

with alkali metal hydroxides in inert solvents. For this reaction, the sulfonamide, in solution in toluene, is heated under reflux with aqueous alkali-metal hydroxide and the water that forms is removed by azeotropic distillation. The salt that is precipitated is filtered off and dried in the absence of moisture. The alkali-metal salts are not affected by atmospheric oxygen and are readily soluble both in dimethyl formamide and in dimethyl sulfoxide, neither of which is decomposed by the catalyst.

The polymerisation initiators are preferably dried before use. They are used in quantities of at least 0.1 millimol and at most 0.1 mol, based on monomer, and preferably in quantities from 0.05 mol to 0.4 millimol. Polymerisation itself is carried out in the absence of water and carbon dioxide in polymerisation vessels which can be effectively cooled. There is, however, no need to remove every trace of oxygen before polymerisation. The catalyst is introduced into the polymerisation medium, preferably at around room temperature, after which the catalyst solution is cooled to around −60° C. Dried monomeric acrylonitrile is then run into the polymerisation vessel over a brief period. When, after a brief latent period, the beginning of polymerisation results in a rise in temperature, precautions, in the form of effective cooling, should be taken to ensure that the temperature in the reaction zone does not exceed a maximum of 5° C. Polymerisation is complete after a few hours, and the polymers can be precipitated from the resulting clear solutions. Equally, it is possible directly to obtain films or fibres from the polymer solutions.

Compared with conventional catalysts, the catalysts according to the present invention are distinguished by the fact that they are not toxic and are easier to measure out accurately, because the sulphonamide salts in question are easily handled, solid compounds which do not give off either hydrocyanic acid or hydrogen sulfide under the influence of carbon dioxide or of acids.

Suitable alkali metals include the metals of the first group of the Periodic System, whilst aliphatic sulfonamides of the formula shown are suitable for use as the sulfonamides. Examples of sulfonamides whose alkali metal salts are suitable for use as catalysts for the polymerisation of acrylonitrile, include N-methyl methane sulfonamide, N-isopropyl methane sulfonamide, N-isobutyl methane sulfonamide, N-methyl butane sulfonamide and N-propyl ethane sulfonamide.

The alkali metal salts of cycloaliphatic sulfonamides such as N-methyl cyclohexane sulfonamide, or the sulfonamide salts of long-chain aliphatic sulfonamides, are equally suitable as polymerisation initiators. The following examples illustrate more particularly the invention.

EXAMPLE 1

1000 parts by volume of dimethyl formamide are introduced into a polymerisation vessel equipped with stirring mechanism. 0.14 part by weight of potassium methane sulfonyl methylamide are then introduced into the stirred solvent in the absence of carbon dioxide. The mixture is brought to a temperature of −65° C. by external cooling, and 145 parts by weight of acrylonitrile are added, also with cooling. Polymerisation begins after a brief latent period. After three hours, a litle HCl dissolved in dimethyl formamide is added to the mixture to stop the polymerisation reaction. A clear, almost colourless polymer solution is obtained. The polymer yield comprises 62%. The K-value of the polymer is 125. Polyacrylonitrile filaments with a light natural colour are obtained from it by the dry spinning process.

EXAMPLE 2

The procedure is as in Example 1, except that only 0.114 part by weight of potassium N-isobutyl methane-sulphonamide are used as initiators. A polymer with a K-value of 112 is obtained in a yield of 99%. Films showing an outstanding resistance to heat can be drawn from the polymer.

EXAMPLE 3

1000 parts by weight of dimethyl formamide are introduced into a polymerisation vessel after air has been displaced from it by dry nitrogen. 0.1 part by weight of lithium N-isobutyl methane-sulfonamide is introduced into the stirred solvent in the absence of $CO_2$ and atmospheric moisture. The mixture is cooled to a temperature of —58° C. after which 106 parts by weight of acrylonitrile are added over a short period. Polymerisation begins quickly and very smoothly. The temperature is kept between —50 and —45° C. for three hours, after which polymerisation is stopped by the addition of a little toluene sulphonic acid. A clear polymer solution is obtained. The polymerisation reaction is almost quantitative. The polymer has a K-value of 123.

EXAMPLE 4

The procedure is as in Example 3, except that 0.2 part by weight of lithium N-isobutyl methane-sulfonamide are used. A clear polymer solution is obtained. The polymerisation reaction is almost quantitative. The polymer has a K-value of 102.

EXAMPLE 5

1000 parts by weight of dimethyl formamide, 0.22 part by weight of lithium N-isopropyl methane sulfonamide and 4 parts by weight of toluene, are introduced into a polymerisation vessel after the air has been displaced from it by dry ethane. The temperature of the mixture is lowered to —63° C., after which 106 parts by weight of acrylonitrile are added over a short period. Polymerisation begins after a brief latent period. The reaction mixture is kept between —30 and —35° C. during the reaction.

After 5 hours, the polymerisation reaction is stopped by the addition of a little HCl in dimethyl formamide. A polymer with a K-value of 84.3 is formed in a yield of 88.7%. Films with an outstanding resistance to heat are obtained from the polymer solution.

What we claim is:

1. A process for the production of spinnable acrylonitrile polymer solutions, which comprises polymerizing monomer consisting essentially of acrylonitrile in an organic solvent suitable for the formation of acrylonitrile spinning solutions at a temperature from +10° C. to —68° C. in the presence of 0.1 millimol to 0.1 mol, based on the monomer, of a catalytic alkali metal salt of an aliphatic sulfonamide of the formula

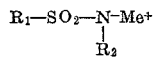

wherein Me represents lithium, sodium, potassium, rubidium, or caesium, $R_1$ represents an alkyl radical, and $R_2$ represents an alkyl radical.

2. The process of claim 1 wherein said alkali metal salt of an aliphatic sulfonamide is potassium-N-isobutyl-methane-sulfonamide.

3. The process of claim 1, wherein said alkali metal salt of an aliphatic sulfonamide is potassium-N-methyl-methane sulfonamide.

4. The process of claim 1, wherein said alkali metal salt of an aliphatic sulfonamide is lithium-N-isobutyl-methane sulfonamide.

5. The process of claim 1, wherein said alkali metal salt of an aliphatic sulfonamide is lithium-N-isopropyl-methane sulfonamide.

6. The process of claim 1, wherein said organic solvent is dimethyl formamide or dimethyl sulfoxide.

References Cited

UNITED STATES PATENTS

| | | | |
|---|---|---|---|
| 2,750,357 | 6/1956 | Bredereck et al. | 260—88.7 |
| 3,012,983 | 12/1961 | Darby et al. | 260—30.8 |
| 3,060,157 | 10/1962 | Goodman et al. | |
| 3,301,841 | 1/1967 | Burleigh et al. | 260—88.7 |

HARRY WONG, Jr., Primary Examiner

U.S. Cl. X.R.

260—32.6, 85.5, 88.7